United States Patent [19]

Vaughn et al.

[11] Patent Number: 5,176,833
[45] Date of Patent: Jan. 5, 1993

[54] FILTERS EMPLOYING PARTICULATE POROUS POLYMERS

[75] Inventors: Walter L. Vaughn, Lake Jackson; Thomas J. McKeand, Jr., Clute, both of Tex.

[73] Assignee: The Dow Chemical Company, Midland, Mich.

[21] Appl. No.: 870,660

[22] Filed: Apr. 20, 1992

Related U.S. Application Data

[60] Division of Ser. No. 429,879, Oct. 31, 1989, Pat. No. 5,133,864, which is a continuation-in-part of Ser. No. 234,978, Aug. 22, 1988, abandoned, which is a division of Ser. No. 776,534, Sep. 16, 1985, Pat. No. 4,766,036.

[51] Int. Cl.⁵ .............................................. B01D 39/04
[52] U.S. Cl. .................................. 210/638; 210/502.1; 210/500.36
[58] Field of Search ............... 210/638, 500.36, 502.1, 210/505, 508; 264/41, 49, 22; 428/401; 427/221

[56] References Cited

U.S. PATENT DOCUMENTS

| | | | |
|---|---|---|---|
| 3,247,133 | 4/1966 | Chen | 210/500.36 |
| 3,666,693 | 5/1972 | Chapiro et al. | 210/500.36 |
| 3,723,306 | 3/1973 | Bridgeford | 210/500.36 |

Primary Examiner—Frank Spear

[57] ABSTRACT

Novel filters are prepared, and filtrations are performed, using porous fibers and filaments which are comprised of normally solid, thermoplastic, orientable, organic polymers which have reactive or reactable groups pendent from the polymer chain, said polymers being made using a process which involves reactions of said pendent groups while the polymer is in an oriented condition. One of the preferred polymers is a copolymer of ethylene/acrylic acid. Ionomers of the polymers can be used.

7 Claims, 1 Drawing Sheet

FILTERS EMPLOYING PARTICULATE POROUS POLYMERS

CROSS-REFERENCE TO RELATED APPLICATIONS

This is a divisional of application Ser. No. 429,879 filed Oct. 31, 1989, now U.S. Pat. No. 5,133,864, which is a continuation-in-part application of Ser. No. 234,978 filed Aug. 22, 1988, now abandoned, which is itself a divisional application of Ser. No. 776,534 filed Sep. 16, 1985, now U.S. Pat. No. 4,766,036. These are incorporated herein by reference.

FIELD OF THE INVENTION

Filters employing novel microporous fibers and particles of olefin polymers which have reactive or reactable groups pendent from the polymer chain.

BACKGROUND OF THE INVENTION

It is well known that there are a large number of man-made thermoplastic polymers and resins which can be melt-extruded as monofilaments for the making of chopped fibers, or as continuous filaments. Many of these can be extruded as multifilaments or fine denier filaments. Fibers and filaments of large denier (generally greater than 15 denier) can usually be melt-drawn from any thermoplastic polymer or resin which has a melt strength sufficient to withstand the tensile forces (gravitational or supergravitational) acting on the weakest portion of the molten extrudate.

The following references contain general information about the preparation and characteristics of high-denier monofilaments, low-denier multifilaments and staple fibers of olefin polymers:

*Encyclopedia of Polymer Science and Technology* (1968), Vol. 9, pp 403–440, pub. by Interscience, New York;

*Kirk-Othmer Encyclopedia of Chemical Technology*, (1981) third edition, Vol. 16, pp. 357–385, John Wiley & Sons, New York;

*Plastics World*, June 1984, page 113;

*Man-Made Fiber and Textile Dictionary*, published by Celanese Corporation;

*Man-Made Fibres* by R. W. Moncrieff, John Wiley & Sons, New York;

*Fundamentals of Fibre Formation* by Andrizej Ziabicki, John Wiley & Sons, New York.

Olefin/unsaturated carboxylic acid copolymers (especially ethylene/acrylic acid) in the form of pellets may be digested with an alcohol/caustic mixture causing the pellets to spontaneously convert into colloidal particles (U.S. Pat. No. 3,798,194) or the pellets may be digested in an amine and agitated to obtain small, non-colloidal, particles and fibers (U.S. Pat. No. 3,790,521). Such olefin/carboxylic acid copolymers are said to be hot-drawn as strands, the strands chopped into pellets, and the pellets digested with an alkali to obtain, upon shearing, small fibers (U.S. Pat. No. 3,801,551).

Ethylene polymerized with unsaturated organic carboxylic acids (ECA), e.g., acrylic acid (EAA), to form copolymers is taught, e.g., in U.S. Pat. Nos. 2,391,218; 3,520,861 and 4,351,931. Copolymers of ethylene and such acids can be made by grafting the acid onto polyethylene, by batch or continuous polymerization of mixtures of monomers of ethylene and the acid, by polymerization of mixtures of monomers of ethylene and the acid in a tubular reactor, and hydrolysis of copolymers of ethylene/alkyl acrylates which converts the ester groups to carboxylic acid groups. Also, block copolymers can be made whereby chain segments of polyacrylic acid and chain segments of polyethylene form long polymer chains. Any of these known ethylene/acid copolymers are suitable for use in the present invention, so long as they are of sufficient molecular weight to be formed into solid particles, fibers or filaments. Thus, the purview of the present disclosure includes, inter alia, ethylenic polymers containing a plurality of carboxylic acid groups in their molecular structure.

In addition to the ethylenic/acid (ECA) copolymers and terpolymers, other olefinic copolymers and terpolymers are within the purview of the present invention so long as the polymer is one which has reactive or reactable groups along the polymer chain as pendent side-groups which can be substantially reacted with a reagent, but where the polymer backbone substantially retains its molecular integrity.

It has now been discovered that there are unexpected characteristics resulting from a change in the known process of forming fibers of certain polymers, such as ethylene/unsaturated carboxylic acid (ECA) copolymers, said known process being that of digesting extruded strands of the polymer in a reagent which substantially reacts with side-groups pendent from the polymer molecule and then subjecting the so-treated polymer to shearing forces to cause fibrillation or particulation of the polymer strands. The said change in the process involves, as the principal distinguishing feature, the orientation (i.e. "stretching") of the polymer at a temperature below that at which stress-relaxation of the stretched polymer molecules is substantially encountered; this may be referred to as "cold-stretching" or "crystalline orientation".

It is customary, in some production processes, for polymers leaving a polymerization vessel to be melt-extruded through a die as strands which are chopped into pellets and cooled in a water bath. U.S. Pat. No. 3,801,551 discloses that such pellets may then be digested in alkaline material and then fibrillated using shearing forces. Since the strands are cut into pellets before the strands have cooled to the point at which crystallization occurs, then stress relaxation of the polymer molecules permits intertwining of the molecules. When such pellets are treated in accordance with U.S. Pat. No. 3,801,551 to prepare fibers, the fibers are relatively short and have very little porosity, if any. Polymers produced as small particles may also be melted, extruded as strands, and chopped into pellets before the intended end-use.

It has been found that if the extruded strands of polymer are allowed to cool to an extent, and for a time, sufficient to allow an appreciable amount of crystallization and are then oriented, the crystallized molecules become substantially untwined and become substantially aligned in parallel relationship with the direction of orientation. This also draws the strands to narrower dimensions. Since the polymer, when oriented, is cold enough for the molecules to be crystallized, and not warm enough to allow stress-relaxation of the molecules, then the molecules remain dimensionally stable after the orientation is completed. When these oriented strands are treated with a reagent which reacts with the side-groups, (e.g. 0.5N NaOH) and subjected to shearing or crushing, the strands undergo fibrillation into fibers which are extensively porous. Most of the pores are small enough to be considered micropores. These micropores permeate the length and breadth of the fibers. Even if the so-oriented strands are chopped into pellets before being treated with alkali and subjected to shearing or crushing, the so-formed fibers are extensively porous and are longer than fibers prepared from pellets of the same dimensions treated in accordance with U.S. Pat. No. 3,801,551.

This same phenomenon is observed when oriented films or strips are treated with alkali and sheared or crushed into fibers, and to a greater degree than when using films or strips which are stretched at high temperatures where stress relaxation of the polymer molecules is possible.

SUMMARY OF THE INVENTION

Porous structure, e.g. filters, are made which comprise novel porous fibers and/or particles of polymers, said polymers being prepared by a method which comprises a) orienting a normally-solid, thermoplastic, orientable, substantially non-elastic polymer having reactive side-groups in the molecular structure of the polymer, said orienting being done at a temperature below that at which a substantial amount of stress relaxation of the stretched molecules is possible, said orienting causing said molecules to align in substantially parallel manner along the direction of orientation.

b) treating the polymer with a chemical reagent which reacts with the reactive groups in the polymer molecular structure, causing swelling of the oriented polymer, c) subjecting the so-swelled polymer to shearing or crushing or other physical force which causes the polymer molecules to undergo sufficient separation so as to form fibers exhibiting microfibrillar texture, and d) optionally, but beneficially, treating the so-formed fibers with a counter-reagent which substantially returns the reactive groups to their original chemical form or to a chemical form which is sterically smaller than the reacted groups created by the reagent, thereby obtaining void spaces (reticules) in the fibers.

Depending on the concentration of reactive side-groups, the extent of orienting, the thoroughness of the treatment with the reagents, and the thoroughness of the fibrillation or particulation, the microporous particles or fibers will exhibit a surface area/weight ratio of at least about 0.5 m²/gm, usually at least about 2 m²/gm, preferably at least about 4 m²/gm, and can be as much as 15 m²/gm or more.

Alternatively, steps c and d above may be reversed, with the counter-reagent treatment preceding the physical force which causes the fibrillation.

Fibers or filaments of polymers made by the above described process, i.e., they are microporous fibers or filaments, are used in making the filters of the presently claimed invention. The filter structure can comprise woven mats, non-woven mats, filament windings, bonded fibers, aggregates of particles, or any structure which is suitable for positioning to receive a fluid on one side and release it out the other side. If made of closely composited loose fibers, other materials such as nets, windings, porous sheets, and the like can be used to hold the fibers in position for operation as a filter. A mat of fibers or other porous body of the filter material can be positioned on a vacuum funnel or a fritted plate for receiving fluid on one side and releasing it on the other side. Furthermore, it is within the purview of the present invention that the porous polymers in the various forms described herein can function as filters or sorbers by being mixed with the fluid sought to be filtered, and the fluid then drained, filtered, or decanted from the polymer.

FIGS. 1–4, not drawn to any particular scale, are offered as visual aids for relating some embodiments of the presently claimed invention.

DETAILED DESCRIPTION

Figure 1:
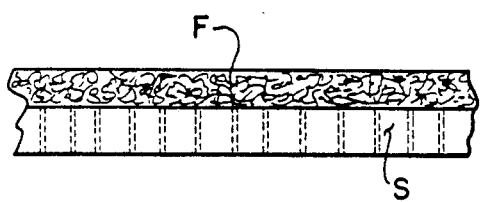

As stated above, the polymers for use in the presently claimed filters are normally solid olefin copolymers or terpolymers which are (1) thermoplastic, (2) melt-extrudable in elongate form, such as sheets, tubes, strands, strips, ribbons or films, (3) orientable (stretchable) to dimensionally stable form at temperatures below that at which stress relaxation of the oriented molecules can occur, (4) contain reactive side-groups pendant from the polymer "backbone", (5) contain little or no groups directly in the polymer backbone structure which are as reactive as the reactive pendent groups under the conditions of reaction, and which are used in making the porous fibers or filaments of the presently claimed filters.

By "normally-solid" it is meant that the polymers are of sufficient molecular weight to be solid at ambient temperatures. "Thermoplastic" means that the polymers can be heat-softened or melted at superambient temperatures. "Extrudable" means that the heat-softened or melted polymer can be forced through an orifice to form a continuous extrudate; this includes simultaneous extrusion of a plurality of strands to form multifilaments or a bundle of filaments.

"Orientable" or "stretchable" means that the solid extrudate, when subjected to sufficient tensile stress, will yield to the stress and become elongated in the direction of tensile stress. A "dimensionally stable form at temperatures below that at which stress relaxation can occur" means that after being oriented under tensile stress, the polymer undergoes little, if any, elastic recoil as long as it is at a temperature below that at which "heat-shrinking" is encountered.

It is within the purview of the present concept to employ normally-solid, thermoplastic, orientable organic polymers comprised of chain segments which conform essentially to at least one of the following graphic representations of formulae:

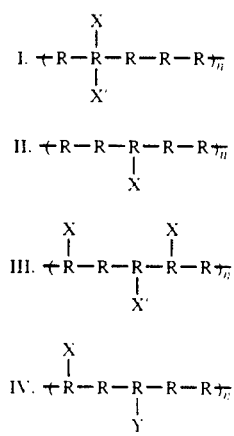

-continued

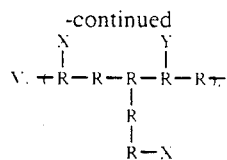

where R represents repeating olefin polymer units forming the stable polymer chain by way of polymerized olefin monomers; n is a number, representing a plurality of the repeating chain segments, that is sufficient to provide normally-solid polymers which are extrudable; X represents substantially reactive or polar side-groups on the polymer; X' represents substantially reactive or polar side-groups that are different from X but may or may not be reactable with the same reagents that react with X; Y represents side-groups that are not reactable with the reagents which react with X.

Thus, it is within the purview of the present concept to employ olefin polymers which have long chain molecular structures formed by the polymerization of monomers comprising at least one olefin or combinations of olefins, said molecular structures having pendent sidegroups which may be substantially all alike or may not be all alike but which are reactive or reactable with a reagent which swells the polymer, and there may also be some pendent side-groups which are not reactive or reactable with the same reagent that is reactable with the said reagent. These non-reactive side-groups may be non-olefin moieties of olefin monomers that are pendent from the polymer chain, such as the alkyl moiety of $C_3$-$C_{12}$ olefins. e.g., propylene, butene, heptene, hexene, octene, dodecene, styrene, and the like, or may be branches of polymerized olefin units which are pendent from the main polymer chain. Furthermore, it is possible, within the purview of the present concept, to employ monomers which are polymerized into the polymer chain through their olefin or vinyl unsaturation whereby pendent moieties of said monomers comprise relatively non-reactive groups such as halogens, esters, nitriles, phenyls, aryls; alkyls, imides, or amides. By "relatively non-reactive" it is meant that the groups undergo little or no reaction with the reagent under conditions at which the reactive groups undergo substantial reaction with the reagent. Polymers which contain such relatively non-reactive side-groups, may exert an influence on the reaction by contributing to the swelling, such as by hydration due to hydrogen bonding between water and the group.

As an example, consider polymers which contain side-groups having reactive carboxylic acid moieties and which also contain the pendent alkyl ester groups of an alkyl acrylate; the carboxylic acid groups can be reacted with a reagent, such as aq. NaOH, under conditions wherein the Na salt of the carboxylic acid is formed, but substantially leaving the alkyl ester groups intact. Likewise, a halogen group on a polymer chain can remain intact (unreacted) under conditions wherein the carboxylic acid group is reacted. However, if the reagent is strong enough, and the reaction conditions stringent enough, even many of the "relatively non-reactive" pendent groups, such as alkyl ester and halogen groups, may be caused to react. The neutralization of —COOH groups by reaction with NaOH is performed more readily than the saponification of —COOR groups with NaOH.

In general the present novel process comprises: orienting the polymer at a temperature (usually ambient or more) below that at which stress relaxation of the stretched molecules is likely to be encountered; cutting, slicing, or chopping the oriented polymer to desired physical dimension, if needed; reacting the reactive side groups of the polymer with a reagent, thereby changing the side groups and swelling the polymer; subjecting the polymer to stress which causes fibrillation or strand separation of the polymer; using a counter-reagent to return the side groups to their original form or to some other suitable form, thereby creating voids in the polymer. Optionally, the reaction with the counter-reagent can be done before subjecting the reacted polymer to fibrillation or strand separation stresses. If the beginning polymer at hand is one which has already been oriented then that initial step as outlined above need not be repeated.

Within the purview of the present invention, the following reactions are among those which may be performed in swelling the cold-stretched polymers:

| Reactive Side Groups Pendent Pendent from a C in the Polymer Chain | Reagent, where M is Metal or $NH_4$, R is Alkyl, X is Halide | Product of Reaction |
|---|---|---|
| —COOH | MOH | —COOM + $H_2O$ |
| —$CH_2$—COOH | MOH | —$CH_2$—COOM + $H_2O$ |
| —COOR | MOH | —COOM + ROH |
| —X | MOH | —OH + MX |
| —O(OC)R | MOH | —OH + R(CO)OM |
| —C—O—$NH_2$ | MOH + $H_2O$ | —COOM + $NH_4OH$ |

Another polymer of interest here is a terpolymer of ethylene/carbon monoxide/unsaturated carboxylic acid (e.g. acrylic or methacrylic acid) wherein the carbon monoxide provides carbonyl (ketone) groups along the chain and the acid provides reactive groups along the chain.

Much of the following descriptions, examples, and explanations are directed to olefin polymers having carboxylic acid side-groups, such as ethylene/acrylic acid (EAA) copolymers, which are among the preferred polymers in the present invention, but the invention is not limited to such polymers. It will be apparent to readers of this disclosure, who are skilled in these relevant arts, that other solid orientable polymers having reactive side-groups may be employed in substantially the same manner as described herein using the descriptions and explanations provided for said EAA polymers.

The highly porous polymers of the present invention are found to be quite useful in many applications where highly efficient separation of compounds or materials from fluid streams is desired. For instance, hardness values are efficiently removed from aqueous carriers, such as mineral water, brine, process streams, and the like. The fibers, especially those wherein the sidegroups are —COOH, have been found to be effective in removing metal cations from solution in aqueous medium and from solution in organic or hydrocarbon media where the polymer is not dissolved or otherwise deleteriously effected by the organic or hydrocarbon; this includes monovalent and polyvalent metal ions, including heavy metals, transition metals, noble metals, rare earth metals, actinide series metals, light metals, alkali metals, and alkaline earth metals.

The porous fibers of the present invention are readily adaptable into the fiber and filament art for the making of monofilaments, multi-filaments, fine denier fibers, staple fibers, corded fibers, and the like. Filaments of greater than 15 denier and fine denier fibers are prepared in accordance with the present invention; "fine denier" generally means less than 15 denier and is so used here, though it should be realized that the extensive porosity of the instant fibers will have a noticeable effect on the relationship between fiber diameter and fiber weight expressed as "denier", especially with the hollow fibers. "Denier" is the weight in grams of a filament 9000 meters in length.

The lower the concentration of reactable side-groups on a given polymer chain, the lower will be the amount of porosity one can obtain with that polymer. In the case of ethylene polymers, as the concentration of side-chain (such as —COOH groups) approaches zero, the lower will be the porosity and also the ability to draw fine denier fibers or multi-filaments at high speed is decreased, even though large denier monofilaments of polyethylene can usually be drawn (i.e., filaments of greater than 15 denier, especially greater than 30).

The porous fibers of the present invention can be formed into non-woven articles, yarns, woven articles, knitted articles, ropes, braided articles, pile loops, and the like. Masses of the polymer fibers can be joined at point-to-point contact by the application of enough pressure to cause sintering or radio-frequency bonding, so long as the "heat-shrink" temperature is substantially avoided. A modicum of heat-shrinking may be beneficial, however, in obtaining a "tight squeeze" of fibers wrapped around a core or mandrel, while sacrificing only a small amount of the porosity by way of the heat-shrinking.

Filaments of ECA polymer granules which are cold-drawn (oriented) can be processed into a mass of microporous fibers. Such orientation results in ribbon-like structures with pendent fibrils and slot-like porosity and extensive microporosity. Moreover, cold-drawing results in fibers of sufficient length to form felts or non-woven mats. The fibrils give the non-wovens enhanced strength. Filaments which are not oriented give a ground-wood like material (short fibers) which can be cast into fragile sheets (or mats). The sheets of fibrous particles formed without cold-draw disintegrate or weaken when wet, or otherwise contacted, with water, whereas sheets or non-wovens derived from a cold-drawn filament are much stronger, even when wet, and can be treated much like a refined paper product made from wood fibers. A novel feature of this non-woven "paper" is that it exhibits ion exchange properties. Orienting allows tiny derivative microporous "ribbons" of several feet length to be mechanically separated from a filament which would otherwise merely disintegrate into a fibrous, particulate mass resembling ground wood. The derivative microporous ribbons can be twisted into a threadlike bundle and even woven into an ion exchange "cloth" completely distinct from a nonporous, particulate or fibrous mass. The advantages of an ion exchange "paper" or "cloth" over a loose particulate mass of polymer are obvious, especially where new uses of the non-woven "paper" or cloth derive from microporosity, usually absent in the non-oriented particulate mass. Microporous fibers from the oriented polymer can be sheared or ground into short lengths, if desired for use in an ion exchange bed. In such a case the microporous fibers exhibit good ion exchange properties, whereas the non-porous particulate polymer form exhibits very poor ion exchange chemistry. This is because the barrier properties of polyolefins conceal the chemistry, except where microporosity exposes the functional groups directly to the environment.

Oriented filaments which are swollen, for instance EAA swollen in hot caustic, can be chopped into tiny porous wafers. Orienting not only produces porosity, but results in a capillary structure resembling the end grain of wood. Excellent ion exchange chemistry results from the induced microporosity. Non-porous granules of sodium salts of ethylene-methacrylic acid or ethylene-acrylic acid do not exhibit useful ion exchange chemistry.

While oriented, the melt-spun filaments of ECA polymer can be swollen to a microporous derivative form exhibiting ion exchange chemistry and even chopped into long fiber, which can be formed into a "pulp" or slurry. The non-wovens formed from melt spun fibers are weak, since no fibrils exist (in melt-spun fibers) to entangle (fibril entanglement is responsible for good strength). Also the "fibers" are usually cylindrical in shape and exhibit a roughly circular cross-section, compared to the ribbon-like structure, which is favored by better strengths and also by better kinetics due to slot-like porosity of microporous ribbons.

Extruded monofilaments may be treated in a continuous manner in accordance with the present novel process by orienting the monofilament (preferably to near its tensile-break strength), treating with caustic to swell the polymer and reacting the reagent with the reactive groups on the polymer, and passing the so-treated monofilament through crushing rollers, which causes fibrillation of the monofilament into a multifilament bundle of microfibrillar texture. Such long multifilaments may be used, as is, in preparing, e.g., woven materials or wrapping on a filter mandrel; or, beneficially, may be twisted into a thread and used in preparing, e.g., woven materials or wrapped on a filter mandrel. Such multifilaments provide benefits not found in ordinary melt-spun blown fiber, or spinnerette multifilaments because the instant fibers have fibrils along the surfaces of the fibers as well as having extensive microporosity.

The present particles or fibers, having extensive microporosity, provide greater access of reagents to the reactive groups on the polymer molecules, permitting as much as 90% or more of the reactive groups to be reacted with the reagent. The porosity is lost if the polymers become dissolved in a solvent or melted.

The following examples illustrate certain embodiments, but the invention is not limited to the particular embodiments illustrated.

EXAMPLE 1

Comparison With Prior Art

In accordance with prior art, an ethylene/acrylic acid copolymer containing 20 wt. % acrylic acid and 80% ethylene, exhibiting a melt index of 300, was melt extruded into a continuous filament of ⅛" diameter, and quenched in water to room temperature. One-inch long segments were cut from the strand and swelled in 0.5n NaOH for 2 hours at 50°–55° C. The segments were readily fibrillated by physical stress into fibers about 1/32 to 1/16 inches long, having a length-to-diameter ratio of 10–15. The fibers were essentially non-porous.

In accordance with the present invention another strand as above was prepared and cooled, but was cold-stretched (oriented) about 100% (one foot stretched to about 2 feet). From this oriented strand were cut one-inch long segments which were swelled for 2 hours at 50°-55° C. in 0.5n NaOH. The segments were readily fibrillated by physical stress into fibers having a length-to-diameter ratio of 300-500 and the fibers were found to be extensively microporous. Fiber lengths of about ¼" were found to be easily fabricable into mats and sheets using paper-making techniques.

EXAMPLE 2

A 10 gm filament of ethylene (80%)/acrylic and (20%) copolymer of ⅛" diameter was cold-drawn (by hand) by a factor of 1.5-2.0 and cut into 1" segments and placed in a swelling bath containing 0.5n NaOH at 55°-60° C. The filament segments, swelled for 4 hours, turned white (they had been essentially clear) and rubbery during swelling. The filaments were drained, washed with de-ionized water, and placed in a bottle with de-ionized water (5% polymer in water) and allowed to shake vigorously on a laboratory mechanical shaker overnight (about 16 hours). An aqueous fiber slurry resulted with fibers ranging up to 1" in length. The slurry was cast onto a 100-mesh wire screen and the water was removed by suction (vacuum) applied to reverse side of the screen. The mat was allowed to air dry and was examined by microscopy. Fibers of 10-30 microns diameter were common with fibrils (branching) of 2-5 microns being very abundant. The fibers were found to be ribbon-like with fibrils composed of small appendage ribbons split from the parent ribbon, and were found to be extensively microporous. The so-formed mat was tough and very strong.

These ribbon-like fine fibers having fibril appendages are believed to be novel and are very useful by way of the tiny fibrils which entangle and give rise to mats, sheets, and articles of exceptional strength without the need to apply supplemental bonding. Furthermore, these novel fibers are quite useful as a blend component with other fibers, such as wood fibers, cotton fibers, cellulose fibers, nylon fibers, wool fibers, polyester fibers, other olefin polymer fibers (e.g. polypropylene), mineral fibers (e.g. asbestos), fiberglass, and other natural or synthetic fibers. The bonding tenacity of the fibril appendages provides considerable strength to mats drawn from a slurry of the blended fibers and also to hot castings of such blends. Filters are made using the above materials.

Still further, the present fibers with the fibril appendages provide strongly bonded composites with non-fibrous pigments, fillers, polymers, resins, or other additives, such as clay, calcium carbonate, titanium dioxide, and other inorganics. The fibers are highly water-absorbent and readily disperse in water to form a synthetic pulp resembling wood pulp; it also behaves much like quality wood pulp in formation of non-wovens. Non-woven products also resemble bleached, refined wood pulp (paper) under microscopic examination.

EXAMPLE 3

Microporous, Oriented Fibers Derived from Melt Spun Polymers

An EAA copolymer (80 wt. % ethylene-20 wt. % acrylic acid and a 300 melt flow value) was extruded through a spinnerette die into a 500-micron diameter strand at 125° C. and then drawn to a 10-micron diameter filament (a drawdown ratio of 1:625, based on filament cross-section. The filament contained orientation resembling a cold-drawn filament. The melt spun fibers were cut from the core (of the haul off unit) in a sheet. The sheet was divided into strips parallel with the fiber length axis. The strips were then mechanically chopped into fibers of 7-10 mm length. The fibers were placed in a Waring blender with water and dispersed, then recovered and redispersed in an excess of a solution containing 0.5N NaOH. The mixture, containing about 15 wt. % chopped fiber by weight, was stirred and heated at 60°-65° C. for about 10-12 minutes. The swollen fibers were drained and thoroughly washed with deionized water and cast onto a 60 mesh stainless steel wire screen. Excess water was drawn off under vacuum and the mat was air dried. The white mat (or felt) exhibited very little strength, due to the absence of pendent fibrils, but did possess microporosity of a fibrillar or slot-like texture. The microporous chopped fibers were useful as intermediates for forming high melting (m.p. above 200° C.) aluminum salt derivative fibers, formed by contacting the microporous chopped fibers with an aqueous solution containing 0.5 wt. % aluminum sulfate. The derivative fibers contained 1.3 wt. % aluminum by weight and were also microporous.

EXAMPLE 4

Exchange of Cations

An ethylene/acrylic acid copolymer (20% AA by wt., 300 melt flow rate) cold-drawn and caustic treated to cause swelling, is fibrillated and washed with water. The so-produced fibers, having extensive microporosity, are found to exchange cations in solutions containing metals, thereby creating ionomers (metal carboxylates) with the carboxylic functionalities on the polymer. The following metals are exchanged, though not all at the same rates:

These metal ionomers of these microporous polymers are novel and useful. They can be used for adding metal values to other materials or for subsequent exchanges of cations. They can also be molded into various shapes and configurations. The ionomers can be

| Metals Exchanged, Periodic Group No. | Especially These Metals |
| --- | --- |
| IA | Li, Na, K, Rb |
| IB | Cu, Ag, Au |
| IIA | Mg, Ca, Sr, Ba |
| IIB | Zn, Cd, Hg |
| IIIA | Al, Ga, In |
| IIIB* | Sc, Y, La, Ce, U |
| IVA | Ge, Sn, Pb |
| IVB | Ti, Zr, Hf |
| VA | As, Sb, Bi |
| VB | V, Nb, Ta |
| VIA | Se, Te |
| VIB | Cr, Mo, W |
| VIIB | Mn, Re |
| VIII | Fe, Co, Ni, Ru, Rh, Pd, Os, Ir, Pt |

*including the Lathanides and Actinides used in filters in the form of fibers, filaments, cords, bonded mats of fibers, woven mats, porous sintered particles, non-woven mats, and the like.

We have found that the instant microporous polymers are capable of forming ionomers with polyvalent metals by cation exchange, whereas prior art involving EAA copolymers and divalent Mg and Ca have involved melt-compounding MgO and CaO into the polymer which created crosslinked polymer with the crosslink being substantially irreversible.

EXAMPLE 5

Filter Cartridge

An EAA copolymer containing 20 wt. % acrylic acid and 80 wt. % ethylene, and having a MFR value of 300 as measured by ASTM D-1238 (190° C./2.16 kg) is ex-truded into a continuous filament of 1.5 mm diameter and stretched (cold drawn) 75%, then swelled five hours in a bath containing an excess of 0.5N NaOH maintained uniformaly at 55° C. The swollen filament is washed in de-ionized water and pressed firmly against a polyethylene sheet with a small stainless steel roller. The filament readily forms a "tape" composed of countless microfilaments and microfilament bundles with filaments ranging from 5-30 micron diameter. About 100 gm of the continuous microfilament bundle is stored wet and about 100 gm is cut into ⅜" to ½" (9.5 mm to 12.7 mm) and beat 20-30 seconds on a Waring* (*tradename) blender (blades reversed to reduce shear during fiber separation from bundles) to form a pulp. Fibers of the pulp exhibit an aspect ratio of about 300-500 with about 100 gm fiber in two quarts of de-ionized water.

The pulp is placed in a one gallon jar and the hollow liquid-permeable core (lower end sealed off) is lowered into the pulp with suction applied to the open end of the core to reduce the pressure within the core and vacuum-deposit (a.k.a. "suction-deposit") a layer of fibers on the core as it is slowly raised from the jar of pulp. Polypropylene string 1/16" (1.6 mm) diameter is spiral-wrapped up and down the fibers on the core to form an open diamond pattern to hold the fibers in place and the process repeated three times. A double wrap of the polypropylene string is applied to the surface (about 25 mm diamond grid) for additional strength. Thus a layer of about ⅜" (9.5 mm) of EAA fibers and polypropylene string is built up on the hollow core. The core is placed in a filter canister and stored wet pending use. (Storing wet is optional, but it helps prevent contamination of the fibers which can absorb material from ambient air.)

EXAMPLE 6

Ion-Exchange With Dissolved Metal

A particulate form of the Na+ form of the EAA of the present invention is added to an aqueous solution containing a dissolved copper compound which imparts a color to the aqueous solvent. After being well-mixed the particulate EAA is filtered out of the aqueous solution. The EAA comes out colored by the copper cations it has taken out of the solvent, and the solvent has become water-clear. Similar results are obtained with a wide spectrum of other metals and other cations.

EXAMPLE 7

Removal of Sorbtive Material

In similar manner as shown in Example 6 above, triethylamine is removed from an aqueous solution by being sorbed by the particulate polymer.

EXAMPLE 8

Removal, of Chemi-sorbtive Material

In similar manner as shown in Example 6 above, an insoluble form of iron hydroxide in alkaline solution is removed from an aqueous solution by being chemi-sorbed by the particulate polymer.

The polymers of the present invention may also be mixed with other materials for use as filter materials, with the other materials providing, e.g., bulkiness, cohesion, economy, formability, esthetics, or other useful features.

FIG. 1 is offered as a visual aid (not to scale) for relating an embodiment of the general concept of supporting a filter material (F) on a substrate (S). The filter material may be of a fibrous or other particulate form and may include non-woven webs, woven webs, entangled fibers (as shown), compacted particles, or any aggregation of the polymer particles which can be deposited on, or supported on, a porous substrate. The substrate may be a plate or slab with holes in it for passage of fluids (as shown), or it may be a sintered support, a cloth, a paper, or another polymer or plastic, so long as the support permits the passage of fluids and does not substantially upset the purpose for which the filter material is to be used.

Figure 2:
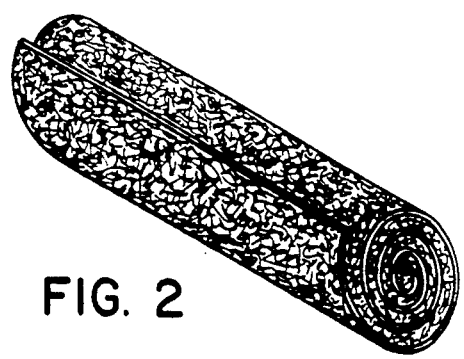

FIG. 2 is offered as a visual aid (not to scale) for relating the general concept of a contiguous, flexible, porous mat of the filter material which, e.g., like paper or cloth, can be wound around a porous core for use as a filter cylinder or cartridge, or can be placed flat on a flat porous support, or can be shaped to fit in a funnel if desired. It can also be inserted between two porous support layers or between a porous and a non-porous layer. The porous mat may be prepared by compression, including the compression obtained by suction-drawing a mat onto a porous support or screen, or may be some other non-woven, woven, or cohered mat of polymer fibers or particles. Woven yarns and cohered yarns are within the purview of this invention.

Figure 3:
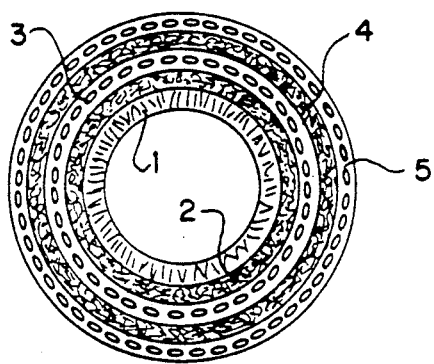

FIG. 3 is offered as a visual aid for relating a hollow core (not to scale) substantially similar, in essence, to the one described in Example 5 above, showing the fibers and polypropylene wrappings in place except that not all the wrappings described in the example are shown here. A cross-section of an end view of porous cylinder (1) is wrapped with fibrous polymer (2), the porous fibers are wrapped with polypropylene strands (3) in an open diamond pattern, another layer of fibrous polymer (4) is placed outside the strands (3) and another diamond-shaped wrapping of polypropylene strands (5) is placed outside fiber layer (4). Thus, an aggregation of polymer fibers may be held in place on the hollow core.

Figure 4:
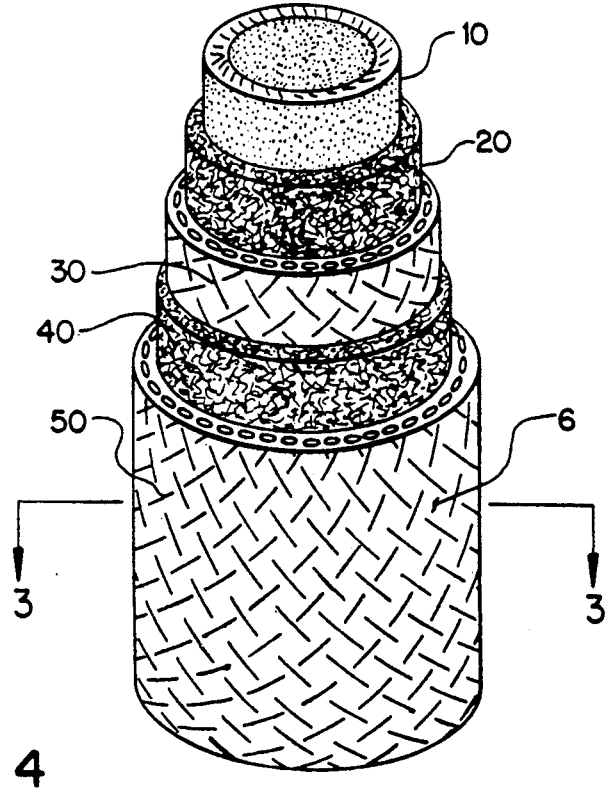

FIG. 4 is offered as a visual aid (not to scale) for relating another view of the wrapped core of FIG. 3, with cut-away portion along B—B of FIG. 3 and A—A of FIG. 4. The hollow core center defined by a circular permeable wall (10) wrapped with fibrous polymer layer (20), polypropylene strands (30) another layer of fibrous polymer (40), and an outer wrapping of polypropylene strands (50). The wrappings are demonstrated as being cross-wrapped to form a porous diamond-shaped net which holds the fibers in place.

What is claimed is:

1. A process for removing filterable, sorbable, or chemi-sorbable substances from a fluid, said process comprising bringing the fluid into contact with filter material and then removing the fluid from the filter material, leaving the said substances with the filter material, wherein the filter comprises composite configurations of particulate forms of at least one normally-solid, microporous, oriented olefin polymer having pendent, reactive or polar, side-groups along the polymer molecules, said side-groups being substantially reactable with a reagent at a temperature below that at which thermal stress-relaxation of the oriented molecules is substantially encountered.

2. The process of claim 1 wherein the said reactive side-groups comprise at least one selected from the group consisting of carboxylic acid groups, amide groups, nitrile groups, ester groups, phosphonate groups, thioester groups, carboxyl groups, sodium carboxylate, potassium carboxylate, lithium carboxylate, or ammonium carboxylate.

3. The process of claim 1 wherein the said filter material is prepared using an olefin polymer wherein the polymer backbone is comprised predominantly of polymerized ethylene units and the reactive side-groups contain the —COOH moieties of at least one acid selected from the group consisting of acrylic acid, methacrylic acid, crotonic acid, maleic acid, itaconic acid, fumaric acid, 1-pentenoic acid, and chloroacrylic acid.

4. A process of removing unfilterable cations, sorbable substances, or chemi-sorbable substances from a fluid, said process comprising bringing the fluid into well-mixed contact with particulate filterable material and then removing the fluid from the particulate filterable material, leaving the said cations, sorbable substances or chemi-sorbable substances with the filterable material, wherein the particulate filterable material comprises at least one normally-slid, microporous, oriented olefin polymer having pendent, reactive or polar, side-groups along the polymer molecules, said side-groups being substantially reactable with a reagent at a temperature below that at which thermal stress-relaxation of the oriented molecules is substantially encountered.

5. The process of claim 4 wherein the fluid which contains the unfilterable material comprises an aqueous solution containing the cations of at least one metal compound.

6. The process of claim 4 wherein the fluid which contains the unfilterable material comprises an aqueous solution containing a substance which is sorbable by the particulate filterable material.

7. The process of claim 4 wherein the fluid which contains the unfilterable material comprises an aqueous solution containing a substance which is chemi-sorbable by the particulate filterable material.

* * * * *